United States Patent
Motohashi et al.

[11] Patent Number: 5,887,228
[45] Date of Patent: Mar. 23, 1999

[54] COLOR IMAGE FORMING APPARATUS INCLUDING PROCESS CARTRIDGE

[75] Inventors: Takeshi Motohashi, Kawasaki; Hiroyuki Matsushiro, Yokohama; Tsuyoshi Deki, Koshigaya; Noriyuki Kimura; Hiroyuki Goto, both of Kawasaki, all of Japan

[73] Assignee: Ricoh Company, Ltd., Tokyo, Japan

[21] Appl. No.: 771,441

[22] Filed: Dec. 20, 1996

Related U.S. Application Data

[63] Continuation-in-part of Ser. No. 732,983, Oct. 16, 1996.

[30] Foreign Application Priority Data

| Oct. 16, 1995 | [JP] | Japan | 7-293449 |
| Dec. 20, 1995 | [JP] | Japan | 7-349249 |
| Apr. 1, 1996 | [JP] | Japan | 8-104623 |
| Apr. 26, 1996 | [JP] | Japan | 8-108018 |

[51] Int. Cl.⁶ .................................................. G03G 21/18
[52] U.S. Cl. ........................ 399/111; 399/121; 399/124; 399/125
[58] Field of Search ............................. 399/111, 112, 399/113, 114, 121, 124, 125, 302, 303

[56] References Cited

U.S. PATENT DOCUMENTS

| 4,974,033 | 11/1990 | Yamada et al. | 399/124 |
| 5,440,373 | 8/1995 | Deki et al. | 399/113 |
| 5,585,889 | 12/1996 | Shishido et al. | 399/113 |
| 5,587,769 | 12/1996 | Sawada et al. | 399/113 |
| 5,652,948 | 7/1997 | Sakaguchi et al. | 399/302 X |
| 5,671,465 | 9/1997 | Kimura et al. | 399/227 X |

FOREIGN PATENT DOCUMENTS

| 2-294673 | 12/1990 | Japan . |
| 4-318875 | 11/1992 | Japan . |
| 4-367869 | 12/1992 | Japan . |

Primary Examiner—William Royer
Attorney, Agent, or Firm—Oblon, Spivak, McClelland, Maier & Neustadt, P.C.

[57] ABSTRACT

A color printer for forming color toner images on a sheet of paper includes a photoconductive belt for bearing an electrostatic latent image thereon, a plurality of developing devices, and an intermediate transfer belt for forming composite toner images thereon. The intermediate transfer belt and the developing devices face each other across the photoconductive belt. The color printer further includes a front frame which is provided adjacent the intermediate transfer medium, a paper feed device which is provided in a lower position of the apparatus, and a paper output tray which is provided in a upper position of the apparatus. A paper transporting path between the paper feed device and the paper output tray is provided between the intermediate transfer belt and the front frame.

20 Claims, 9 Drawing Sheets

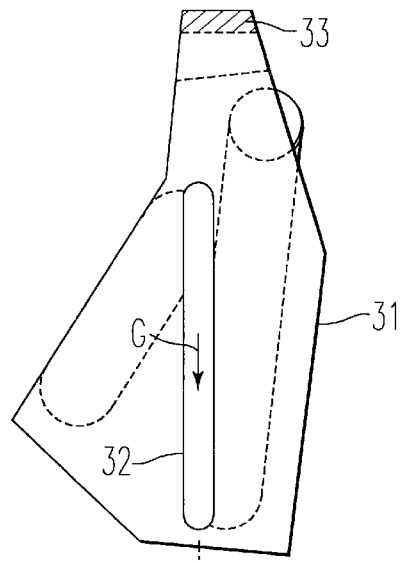
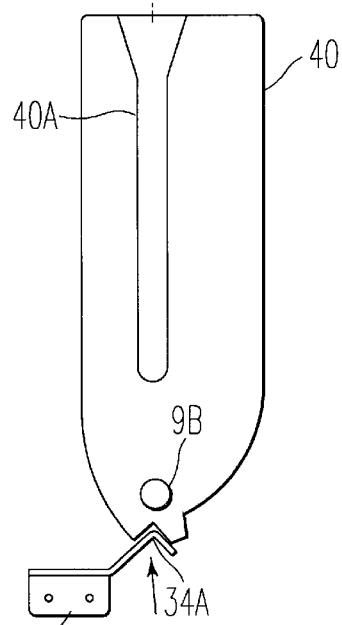
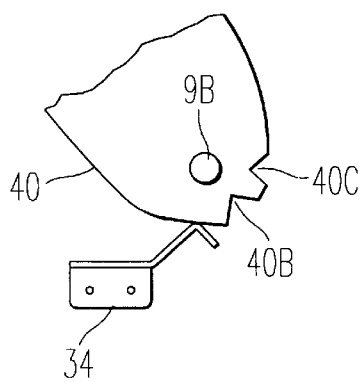
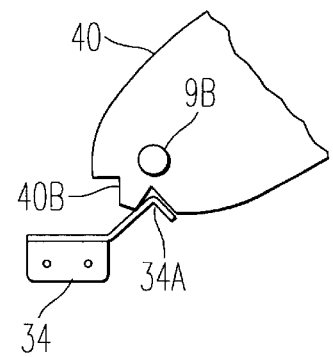
FIG. 10A　　　FIG. 10B　　　FIG. 10C

COLOR IMAGE FORMING APPARATUS INCLUDING PROCESS CARTRIDGE

CROSS REFERENCE TO RELATED APPLICATION

The present invention is a continuation-in-part of copending U.S. application Ser. No. 08/732,983 filed Oct. 16, 1996, which is incorporated herein by reference.

BACKGROUND OF THE INVENTION

1. Field of the Invention

The present invention relates to a color image forming apparatus such as a copier, a printer, a facsimile machine or similar electrophotographic image forming apparatus. More particularly, the invention is concerned with a color image forming apparatus which has a process cartridge including at least one of an image bearing member such as a photoconductive medium and an intermediate transfer medium.

2. Discussion of Background

A conventional color image forming apparatus has an intermediate transfer belt on which composite color toner images which include at least one of yellow, magenta, cyan and black toner are formed. The composite toner images on the intermediate transfer belt are then transferred to a sheet of paper.

In such an apparatus, not only a developing device and a photoconductive medium but also the intermediate transfer belt has to be replaced when the belt reaches the end of its useful life.

Further, since a length of the intermediate transfer belt with respect to a rotating direction of the intermediate transfer belt has to be more than a maximum paper size, for example the length of the intermediate transfer belt has to be more than 260 mm if the maximum paper size is A3 size, the color image forming apparatus becomes large.

SUMMARY OF THE INVENTION

Accordingly, it is an object of the present invention to provide a novel color image forming apparatus in which replacement of devices for making the toner image on the sheet of paper is easy.

It is another object of this invention to provide a novel color image forming apparatus of small size.

In order to achieve the above-mentioned objects, according to the present invention, a color image forming apparatus for forming color toner images on a sheet of paper includes an apparatus body, a photoconductive medium in the body for bearing an electrostatic latent image thereon, a plurality of developing devices in the body for developing the latent image, an intermediate transfer medium in the body for forming composite toner images thereon, a front frame which is provided adjacent the intermediate transfer medium, a paper feed device which is provided in a lower position of the apparatus, a paper output tray which is provided in an upper position of the apparatus, and a paper transporting path between the paper feed device and the paper output tray, which is provided between the intermediate transfer medium and the front frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10(A)–10(C) show how the process cartridge is replaced;

DESCRIPTION OF THE PREFERRED EMBODIMENTS

Figure 1:
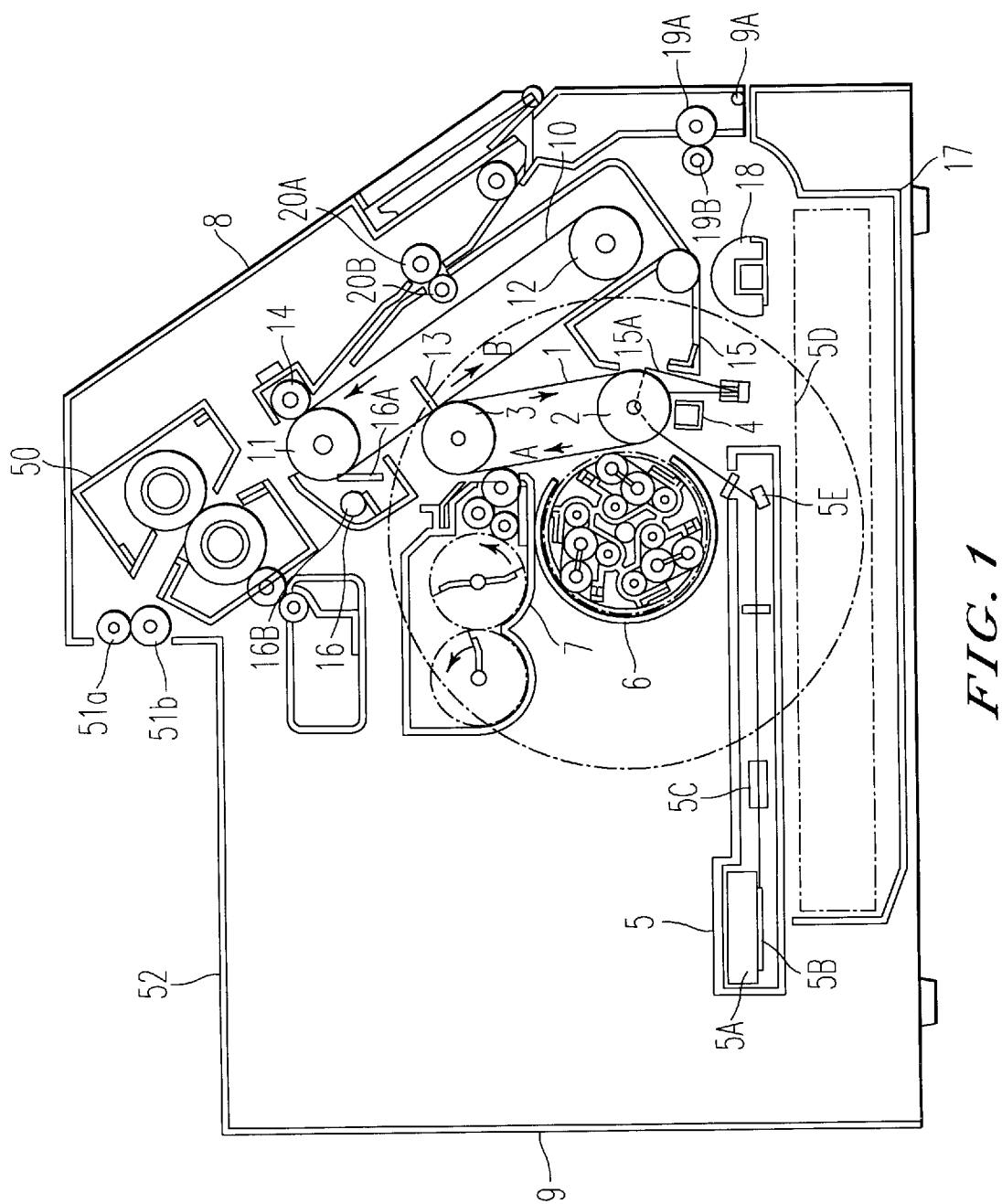
FIG. 1 is a front sectional view of a color image forming apparatus of the present invention.

Referring now to the drawings, wherein like reference numerals designate identical or corresponding parts throughout the several views, and more particularly to FIG. 1 thereof, a color printer embodying the present invention is shown and includes a photoconductive belt 1 which is vertically supported by a driving roller 2 and a roller 3 in the color printer. The photoconductive belt 1 rotates in a direction indicated by an arrow A. The printer has the following elements disposed around the belt: a charger 4 which charges the photoconductive belt 1, a laser optics unit 5 which forms a latent image on the photoconductive belt 1, a revolving type developing device 6 which has an yellow developing unit, a magenta developing unit and a cyan developing unit, a black developing device 7, an intermediate transfer belt 10 which is supported by rollers 11 and 12 for rotating in a direction indicated by an arrow B, and a cleaned toner container 15 which has a cleaning blade 15a for cleaning residual toner on the photoconductive belt 1.

The intermediate transfer belt 10 is supported aslant in the printer and is held in contact with the photoconductive belt 1 at the driving roller 3. An electric conductive bias brush 13 is held in contact with the back side of the intermediate transfer belt 10. A cleaning device 16 is disposed around the intermediate transfer belt 10. The cleaning device 16 has a cleaning blade 16a which is spaced from the photoconductive belt 1 during the image forming period and is held in contact with the photoconductive belt 1 after a toner image on the photoconductive belt 1 is transferred to a sheet of paper, e.g., copysheet.

A paper cassette 17 is disposed at the bottom of the printer. A copysheet in the paper cassette 17 is fed by a paper feed roller 18, and then transported to a nip between the photoconductive belt 1 and the transfer roller 14 by a pair of paper feed rollers 19a and 19b and a pair of registration rollers 20a and 20b.

In operation, the photoconductive belt 1 is uniformly charged by the charger 4, and then the charged surface of the photoconductive belt 1 is exposed by the laser optics unit 5 to form an electrostatic latent image on the photoconductive belt 1. Full color image information to be formed as a color image is separated into yellow image information, magenta image information, cyan image information and black image information. A semiconductor laser 5A emits a laser beam 5B corresponding the yellow image information. The laser beam 5B is steered by a polygonal mirror 5C, rotated by a polygonal motor and is projected onto the photoconductive belt 1 via a lens 5D and a reflecting mirror 5E.

The yellow electrostatic latent image is developed by the yellow developing unit, and then a yellow toner image on the photoconductive belt 1 is transferred to the intermediate transfer belt 10 by electric bias voltage applied from the electric conductive bias brush 13. The same operations are executed for magenta, cyan and black development sequences. The yellow, magenta and cyan developing operations are executed by the revolving type developing device 6, and the black image formation is executed by the black developing device 7. The yellow, the magenta, the cyan and the black toner images are sequentially transferred to the copysheet at one time by an electric bias voltage applied from the transfer roller 14. The length of the intermediate transfer belt 10 between the electric conductive bias brush 13 and the transfer roller 14 over the roller 12 is longer than the length of the maximum copysheet with respect to the longitudinal direction of the copysheet. In the present embodiment, the maximum copysheet is A3 copysheet. After the transfer operation, a full color toner image on the copysheet is fixed by a fixing device 50. The copysheet is then discharged on a paper tray 52 by a pair of paper discharging rollers 51a and 51b. Since the paper path between the pair of paper feed rollers 19a and 19b and the fixing device 50 is straight, paper jamming is prevented.

Residual toner on the intermediate transfer belt 10 is cleaned by the cleaning blade 16a. The residual toner is then transported to the cleaned toner container 15 via an auger 16b and a toner transporting device (not shown). The cleaned toner container 15 is disposed in space formed between the photoconductive belt 1 and the intermediate transfer belt 10 and is replaceable with a new one. Since not only the cleaned toner on the photoconductive belt 1 but also the cleaned toner on the intermediate transfer belt 10 are contained in the cleaned toner container 15, all of the cleaned toner can be removed by replacing the container.

When an inputted image is a black color image, after the electrostatic latent image is formed on the photoconductive belt 1, the black developing device 7 is operated to form a black toner image on the photoconductive belt 1. The black toner image is transferred to the intermediate transfer belt 10, and then it is transferred from the intermediate transfer belt 10 to the copysheet. Other image forming processes are the same as the full color image forming process.

The photoconductive belt 1, the charger 4, the intermediate transfer belt 10, the cleaning device 16 and one of the registration rollers 20b are integrated as a process cartridge 31 which is replaced when one of the process devices reaches the end of its useful lifetime. The cleaned toner container 15 is also mounted on the process cartridge 31. However, the cleaned toner container 15 is separate from the process cartridge 31, and when full of toner, can be replaced separately from the process cartridge 31. The registration roller 20b is mounted on an outer surface 31a of the process cartridge and the outer surface 31a works as a paper guide plate.

Since the supporting rollers 2 and 3 for the photoconductive belt 1 and supporting rollers 11 and 12 for the intermediate transfer belt 10 are supported on a common frame of the process cartridge 31, the photoconductive belt 1 and the intermediate transfer belt 10 are positioned accurately. As a result, the image is of good quality. Further, the photoconductive belt 1 and the intermediate transfer belt 10 are disposed such that the surface of the photoconductive belt 1 and the surface of the intermediate transfer belt 10 that faces the surface of the photoconductive belt 1 make an acute angle. Therefore, a thickness of the process cartridge 31 becomes small, and as a result the size of the color printer becomes small.

Figure 2:
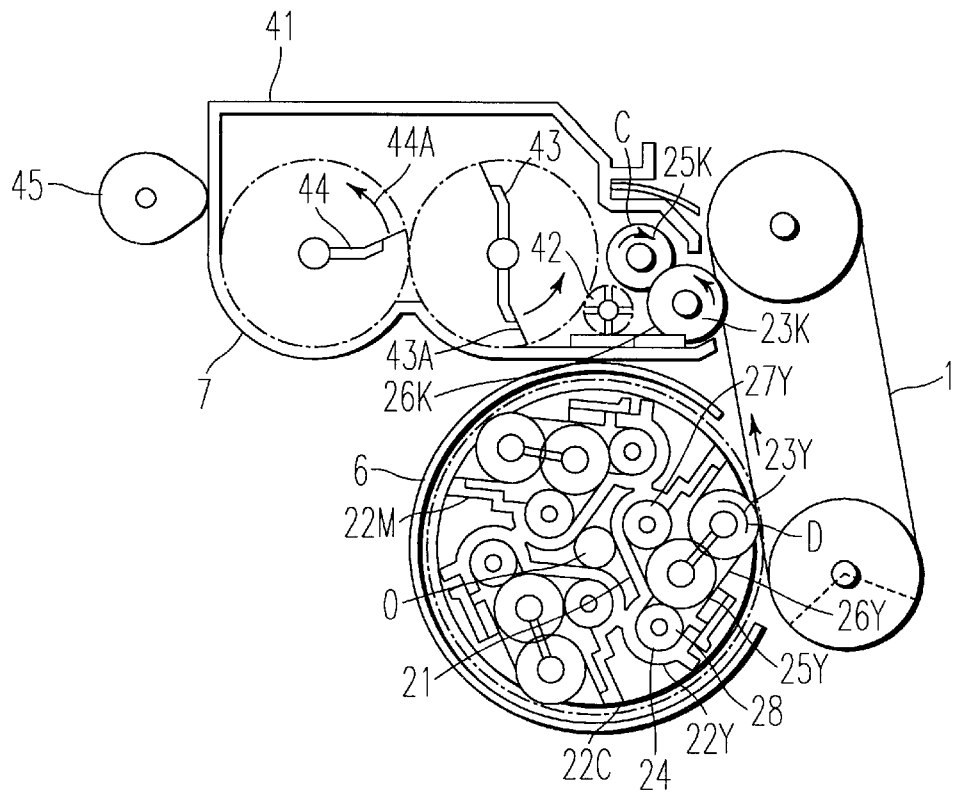
FIG. 2 a front sectional view of a black developing device and a revolving type developing device of the present invention.

FIG. 2 shows the revolving type developing device 6 and the black developing device 7 of the present invention. The black developing device 7 includes a toner container 41 which contains black toner and a developing roller 23K having a surface which is projected from an opening thereof. The black developing device 7 is replaced when the black toner becomes exhausted. It is also possible to replace a black toner cartridge instead of replacing the black developing device 7. A toner supply roller 25K made of polyurethane foam is rotatably supported in the toner container 41 to supply the toner to the developing roller 23K. A longitudinal direction of the toner supply roller 25K is parallel to that of the developing roller 23K, and the toner supply roller 25K is in pressure contact with the developing roller 23K to form a nip. The surface of the toner supply roller 25K moves in an opposite direction to that of the surface of the developing roller 23K at the nip. Toner on the toner supply roller 25K is supplied to the developing roller 23K at the nip.

A blade 26K of an elastic thin plate of stainless steel is provided in the toner container 41. A free end of the blade 26K is held in pressure contact with the surface of the toner supply roller 25K to regulate the thickness of the toner on the surface of the toner supply roller 25K. A bladed agitating paddle 42 is rotatably supported in the toner container 41, and rotates in a direction indicated by an arrow C. The agitating paddle 42 agitates toner near the toner supply roller 25K to prevent accumulation of toner which is removed from the surface of the toner supply roller by the blade 26K. Further, the agitating paddle 42 supplies toner to the toner supply roller 25K.

A first agitator 43 and a second agitator 44 are also provided in the toner container 41. The second agitator 44 agitates toner in the toner container 41 and transports toner to the first agitator 43. The first agitator 43 agitates toner in the toner container 41 and transports toner to the toner supply roller 25K. Elastic film sheets 43a and 44a are fixed on free ends of agitators 43 and 44, and have free ends which can contact the inner bottom surface of the toner container 41. Since the free ends of the elastic film sheets 43a and 44a contact the bottom inner surface of the toner container 44 upon rotation of agitators 43 and 44, almost all toner in the toner container 41 is transported to the toner supply roller 25K. It is desirable that rotary speed of the agitators 43 and 44 is as slow as possible so as not to apply stress to the toner.

The revolving type developing device 6 includes a casing 21 which supports a yellow developing device 22Y, a magenta developing device 22M and a cyan developing device 22C, and rotates around a rotating axis O in order to sequentially position each of developing devices 22Y, 22M and 22C at the developing position. Each of the developing devices 22Y, 22M and 22C stores a non-magnetic one component developer. Since each of the developing devices 22Y, 22M and 22C has the same structure and operates in the same manner, only the structure of the yellow developing device 22Y is explained.

The yellow developing device 22Y has a yellow developing roller 23Y. In FIG. 2, since the yellow developing device 22Y is in the operating condition, the surface of the yellow developing roller 23Y is held in contact with the surface of the photoconductive belt 1 to make a nip between the surface of the yellow developing device 23Y and the surface of the photoconductive belt 1. The yellow developing roller 23Y rotates in a direction indicated by an arrow D. A toner supply roller 25Y, which is an elastic roller made of polyurethane foam, is provided below the yellow developing roller 23Y. The surface of the toner supply roller 25Y is held in pressure contact with the surface of the yellow developing roller 23Y. The toner supply roller 25Y rotates in the opposite direction to that of the yellow developing roller 23Y and at a different speed than the yellow developing roller 23Y. A free end of an elastic thin blade 26Y made of stainless steel is held in pressure contact with the surface of the yellow developing roller 23Y. A toner transport screw 27Y is also provided in the yellow developing device 22Y so as to transport toner from the top side to the bottom side, as shown in FIG. 2.

When the black developing device 7 is in the non-operating condition, the surface of the developing roller 23K is separated from the surface of the photoconductive belt 1. In this condition, the developing roller 23K is not rotated, in order to prevent scatter and leakage of toner from the opening 41a of the black developing device 7. When the color developing device is in the non-operating condition, the casing of the revolving type developing device 6 faces the surface of the photoconductive belt 1 at a distance. In the present embodiment, the portion of the casing of the revolving type developing device 6 between the yellow developing roller 23Y and the cyan developing roller 23C always faces the photoconductive belt 1 at a distance when the color developing device is in the non-operating condition. According to the present embodiment, the yellow developing roller 23Y is operated first, before the other developing rollers 23M and 23C during full color image formation, and quickly faces the photoconductive belt 1.

When the black developing device 7 is in the operating condition, the black developing device 7 is shifted in position by means of a cam 45, and then the surface of the developing roller 23K is held in pressure contact with the surface of the photoconductive belt 1. When one of the color developing device is in the operating condition, the revolving type developing device 6 rotates until that one of the developing rollers faces the surface of the photoconductive belt 1.

Figure 4:
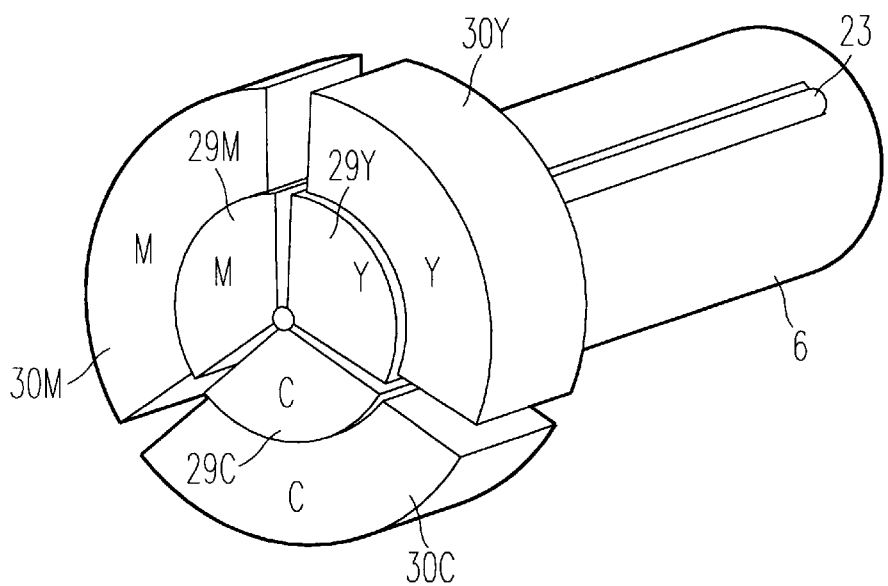
FIG. 4 is a perspective view of the revolving type developing device of the present invention.
Figure 3:
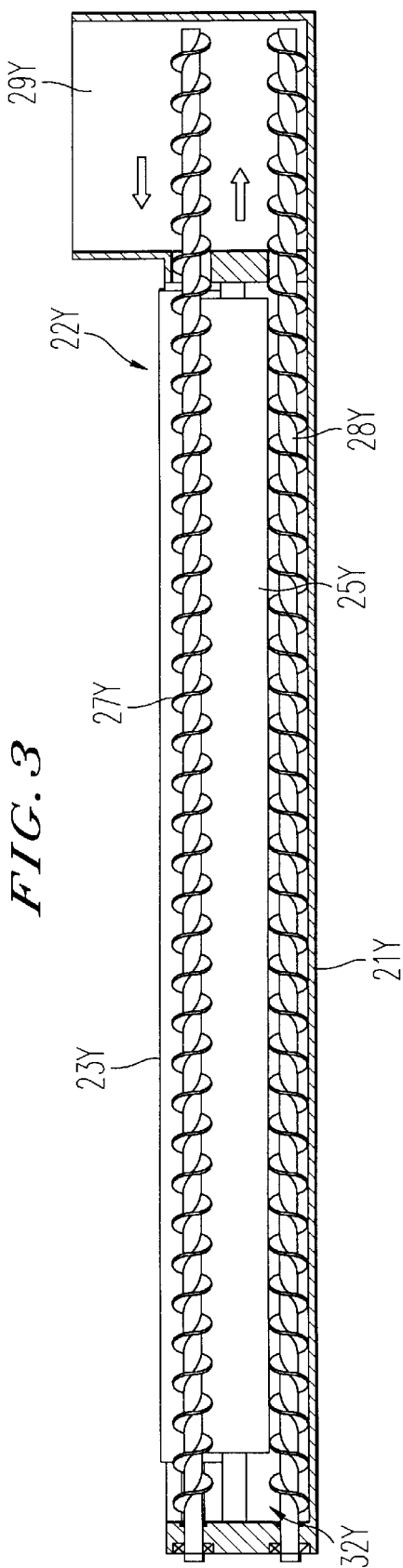
FIG. 3 is a transverse sectional view of the yellow developing device of the present invention.

FIG. 3 is a transverse sectional view of the yellow developing device 22Y, and FIG. 4 is a perspective view of the revolving type developing device 6. Referring to FIGS. 3 and 4, a toner container 29Y is provided at one end of the yellow developing device 22Y. The toner transport screw 27Y is positioned parallel to the developing roller 23Y between the side plates of the developing device 22Y.

In FIG. 3, the toner transport screw 27Y rotates synchronized with the developing roller 23Y and the toner supplying roller 25Y so as to transport the toner from the toner container 29Y to the other side of the casing 21Y with respect to the longitudinal direction of the toner transport screw 27Y. By this operation, toner in the toner container 29Y is supplied to the toner supplying roller 25Y, and then the toner on the toner supplying roller 25Y is charged at the nip between the surface of the toner supplying roller 25Y and the surface of the yellow developing roller 23Y and supplied to the surface of the yellow developing roller 23Y. The toner on the surface of the yellow developing roller 23Y is then passed through the nip between the surface of the yellow developing roller 23Y and the blade 26Y. A thin and uniform toner layer is formed on the yellow developing roller 23Y after passing through the nip. The toner on the yellow developing roller 23Y is developed on the surface of the photoconductive belt 1.

Toner on the yellow developing roller 23Y, which is not used in the developing process is transported to toner circulating space 32Y which is provided beyond of the yellow developing roller 23Y and the toner supplying roller 25Y with respect to the longitudinal direction of the both of rollers 23Y and 25Y. The toner which is transported to the toner circulating space by the toner transport screw 27Y is dropped to the bottom of the yellow developing device 22Y and then transported to the toner container 29Y by a toner transport screw 28Y which is disposed at the bottom of the yellow developing device 22Y.

Referring to FIG. 4, a yellow toner cartridge 30Y, a magenta toner cartridge 30M and a cyan toner cartridge 30C are each attached to a respective yellow toner container 29Y, a magenta toner container 29M and a cyan toner container 29C. Each of the toner cartridges 30Y, 30M and 30C is replaced when toner in the respective toner cartridges becomes empty.

Figure 5:
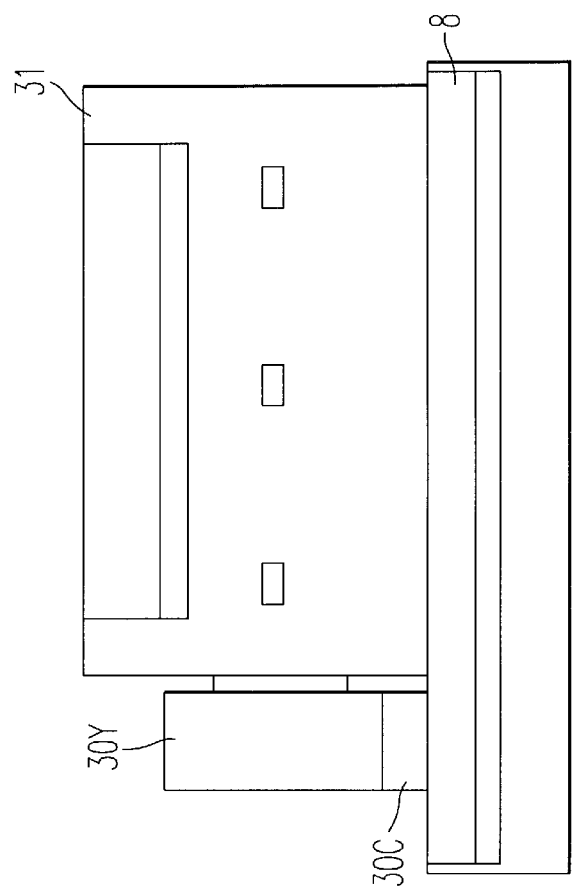
FIG. 5 is a plan view of a process cartridge and a toner cartridge of the present invention.

In FIG. 5 it can be seen that the toner cartridges 30Y, 30M and 30C are positioned outside of the projected plane of the process cartridge 31. Therefore, when the front frame is opened, the toner cartridges 30Y, 30M and 30C are exposed beyond the process cartridge 31 without detaching the process cartridge 31 from the color printer.

Figure 6:
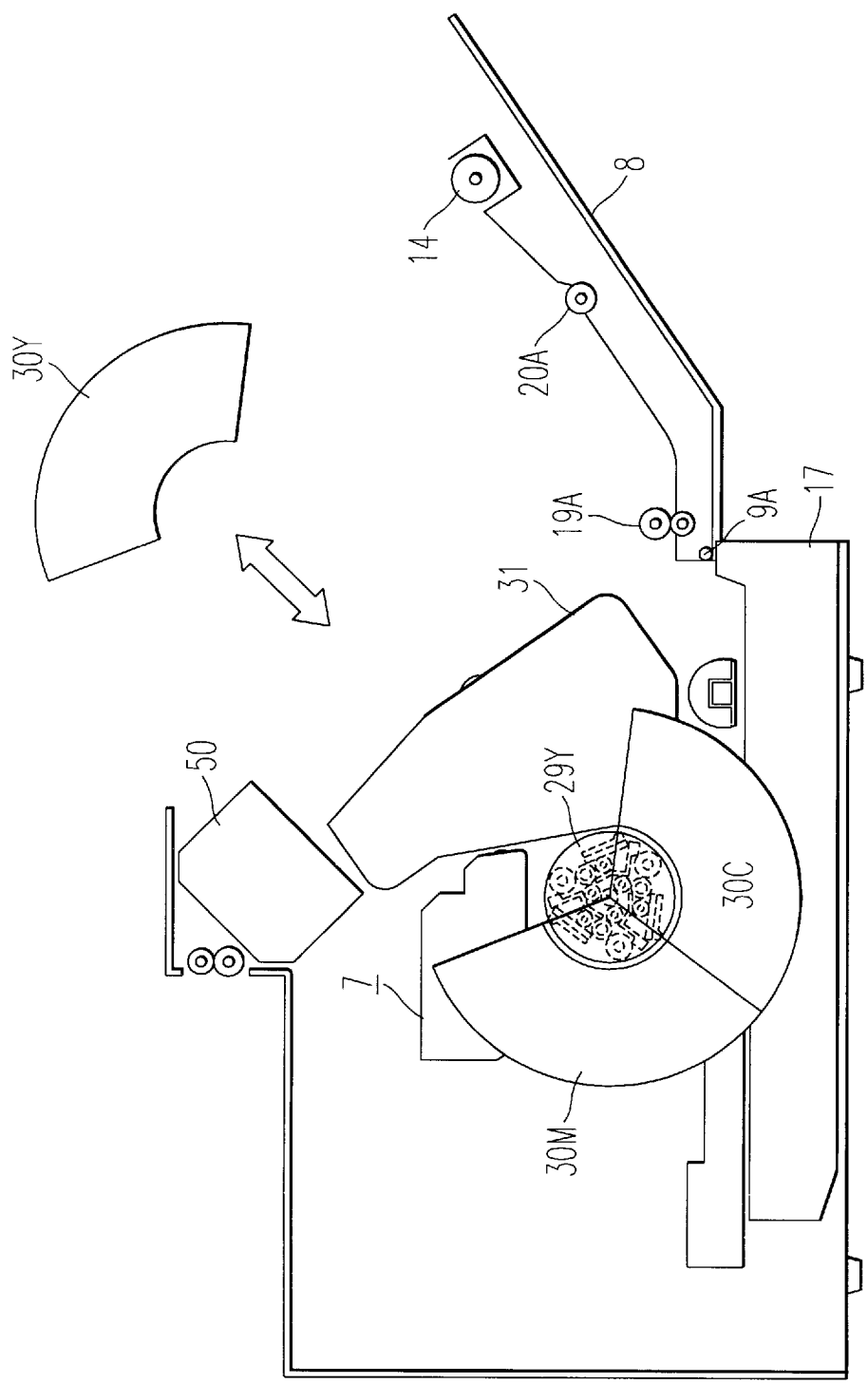
FIG. 6 is a view similar to FIG. 1, showing how the toner cartridge is replaced.

FIG. 6 demonstrates how the yellow toner cartridge is replaced. When the quantity of the yellow toner in the yellow developing device 22Y is less than a predetermined quantity, a sensor outputs a toner empty signal, and toner replacing information is displayed on a control panel of the color printer.

The yellow toner cartridge 30Y can be removed in a direction indicated by an arrow, and then a new yellow toner cartridge can be installed in a direction indicated by an arrow. The magenta toner cartridge 30M and the cyan toner cartridge 30C can be replaced at the same manner as the yellow toner cartridge. According to the present embodiment, each of the toner cartridges 30Y, 30M and 30C can be replaced without moving other process devices such as the revolving type developing device 6, the black developing device 7 and the process cartridge 31.

Figure 7:
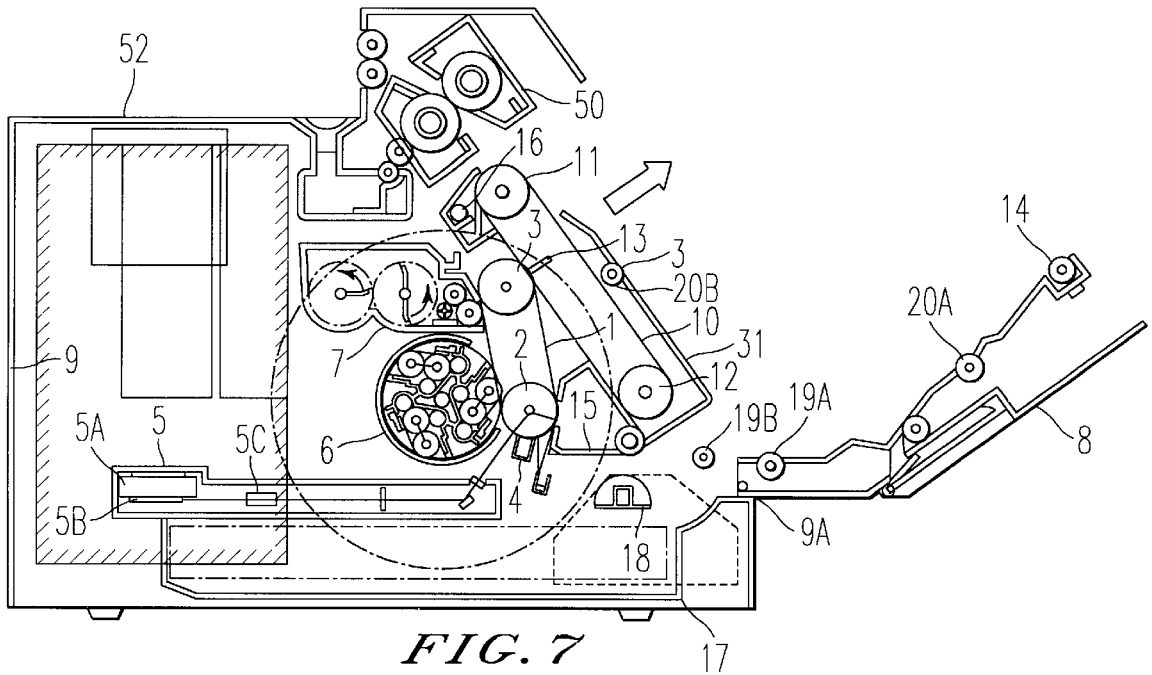
FIG. 7 is a view similar to FIG. 1, showing an opened front frame of the color image forming apparatus.

FIG. 7 shows the color printer in which a front frame 8 is opened. In FIG. 7, the body of the color printer includes the front frame 8 and a main frame 9. When the front frame 8 is opened, a paper transport path is exposed. The paper cassette 17 is disposed at the bottom of the main frame 9. The revolving type developing device 6, the black developing device 7 and the process cartridge 31 are provided in the main frame 9. Each of the revolving type developing device 6, the black developing device 7 and the process cartridge 31 can be individually replaced when the respective device reaches the end of its useful lifetime. The fixing device 50 is also provided in the main frame 9 and the top of the main frame functions as a paper discharging tray 52.

The bottom of the front frame 8 is rotatably supported at a rotating axis 9A provided on the main frame 9. The front frame 9 is usually closed as shown in FIG. 1. If a paper jam occurs in the paper transport path, the paper transport path can be exposed by opening the front frame 8 after unlocking the front frame 8. Since the paper feed roller 19a, the registration roller 20a and the transfer roller 14 are provided on the front frame 8, if the front frame 8 is opened, the paper transport path is completely exposed. Even if the front frame 8 is opened, the revolving type developing device 6, the black developing device 7 and the process cartridge 31 are stationary in the main frame 9. According to the present embodiment, a paper jam recovery operation becomes easy, and scatter of toner and leakage of toner during the paper jam recovery operation is prevented.

Figure 8:
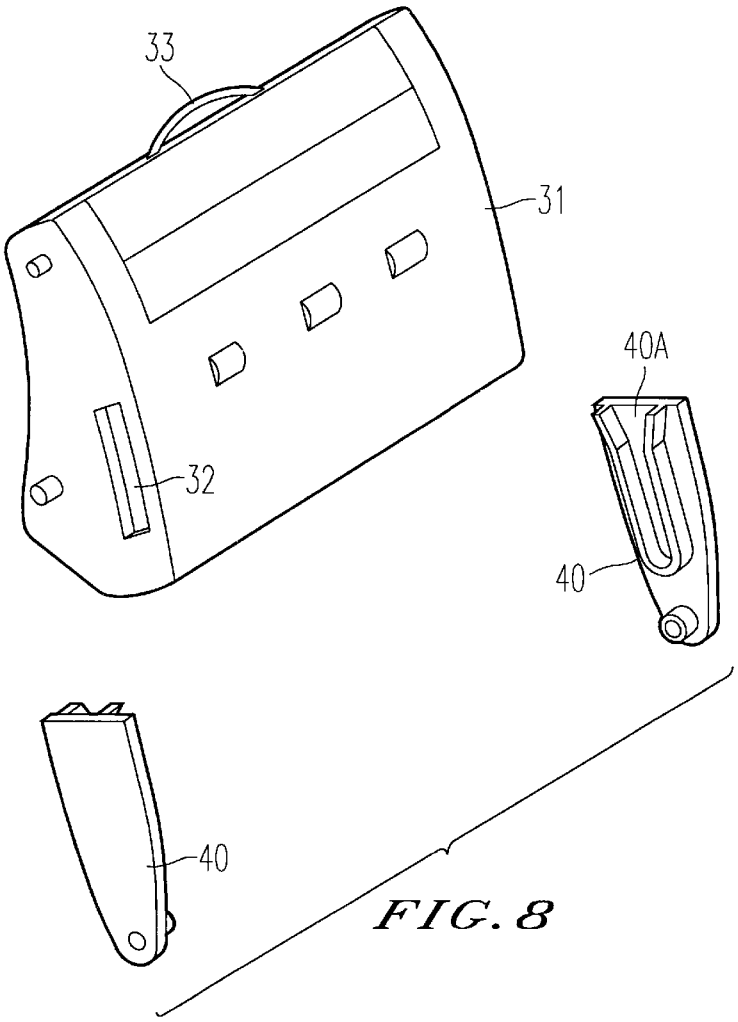
FIG. 8 is a perspective view of a process cartridge and a sub-frame for supporting the process cartridge of the present invention.
Figure 9:
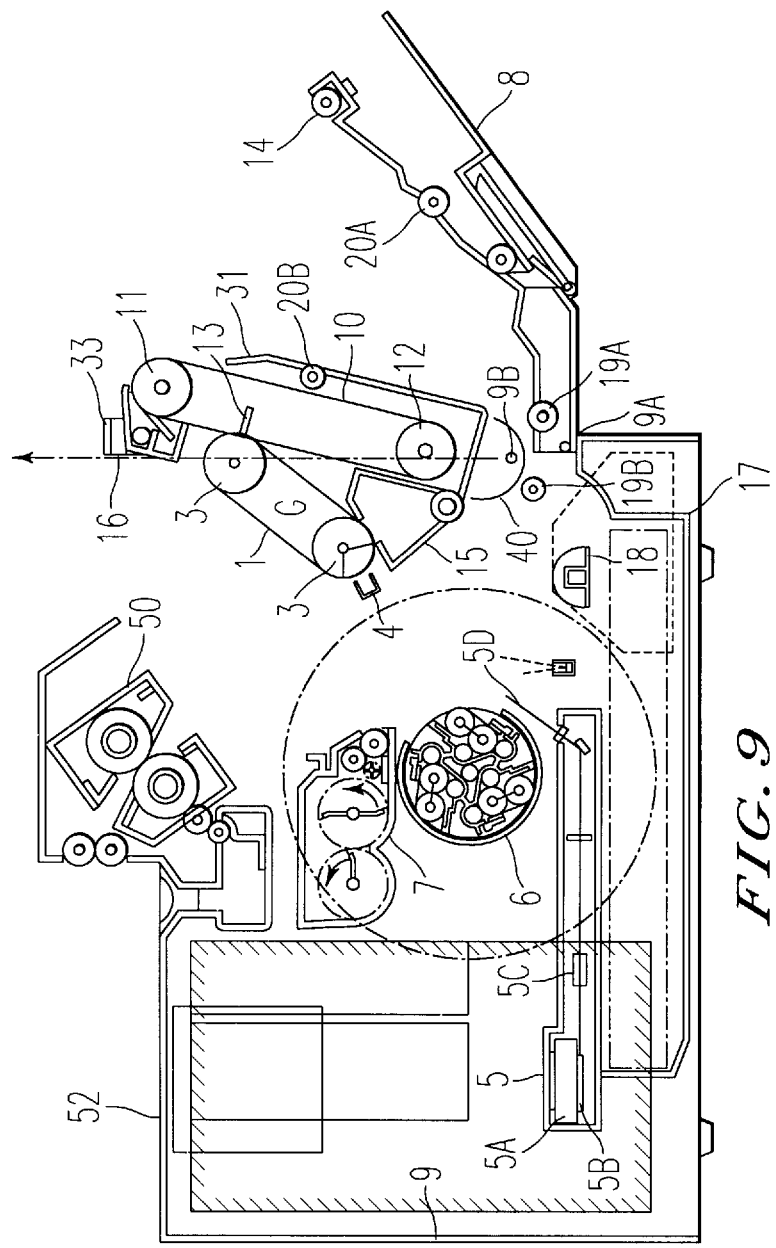
FIG. 9 is a view similar to FIG. 1, showing the opened front end frame and the moved sub-frame.

In FIGS. 8, 9 and 10 there is shown a sub-frame 40 which supports the process cartridge 31 on the main frame 9. The sub-frame 9 rotates around a rotating axis 9B. Projections 32 are provided on the both side plates of the process cartridge 31. The projections 32 are guided along recesses 40A which are provided on the sub-frame 40. Since the width of the top of the recesses 40A is larger than that of the other portion of the recesses 40A, the projections 32 of the process cartridge 31 are easily inserted into the recesses 40A. A handle 33 is provided on the process cartridge 31.

FIG. 10 shows how the sub-frame 40 is positioned in three positions. In FIG. 10, two recess 40B and 40C are formed on the bottom of the sub-frame 40, and a bent portion 34A of a spring plate 34 can fit into the recess 40B and 40C to fix the sub-frame in its position. FIG. 10A shows an operating condition of the color printer as shown in FIG. 1. FIG. 10B shows a position where the process cartridge 319. FIG. 10C shows a shown in FIG. 9. FIG. 10C shows a position where the developing devices 6 and 7 are being replaced as shown in FIG. 11.

In the position of FIGS. 9 and 10B, the recesses 40A extend vertically and the extended lines of the recesses 40A pass through the rotating axis 9B. In that condition, the center of gravity G of the process cartridge 31 passes through the rotating axis 9B of the sub-frame 40 when the process cartridge 31 is in the sub-frame 40. Further, the handle 33 is positioned on the extended line of the recesses. The process cartridge 31 therefore hangs down vertically when it is inserted into and removed from the sub-frame 40 in a vertical direction. According to the present embodiment, since the process cartridge 31 extends vertically and is inserted vertically, it is easily inserted into and removed from the sub-frame 40. Further, the force of the spring plate 34 can be reduced.

Figure 11:
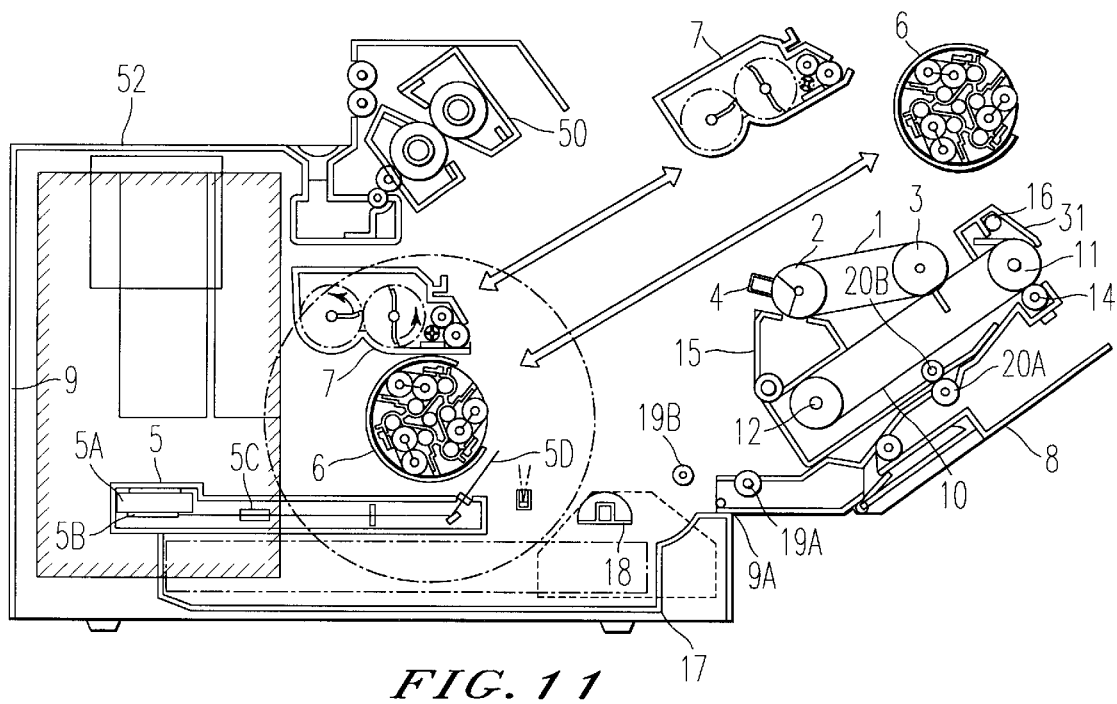
FIG. 11 is a view similar to FIG. 1, showing how the developing devices are replaced.

In FIGS. 10C and 11, the sub-frame 40 is opened as the developing devices 6 and 7 are completely exposed when the bent portion 34A of the spring plate 34 fits into the recess 40C. In that condition, the revolving type developing device 6 and the black developing device 7 can be replaced without removing the process cartridge 31 from the sub-frame 40.

If the sub-frame 40 stops its rotation a portion of the sub-frame 40 coming into contact with the front frame 8, it is not necessary to provide the recess 40C.

Figure 12:
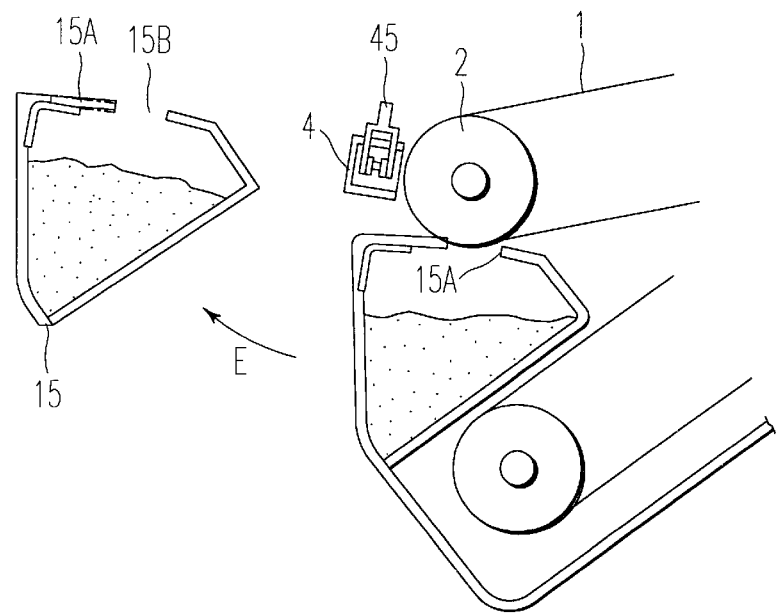
FIG. 12 shows how a cleaned toner container is replaced.

FIG. 12 shows the condition where the sub-frame 40 is opened as shown in FIG. 11. In FIG. 12, the charger 4 is exposed when the sub-frame 40 with the process cartridge 31 is opened. In that condition, an operator can clean the charging wire of the charger 4 by means of a charging wire cleaner 45 by moving the charging wire cleaner 45. The charging wire cleaner 45 is disposed outside of the charging area of the charging wire when an image forming operation is executed.

Further, the cleaned toner container 15 is removed from the process cartridge 31 in a direction indicated by an arrow E. During the removing operation of the cleaned toner container 15, since an opening 19b faces upward, toner in the container 15 is not scattered.

Figure 13:
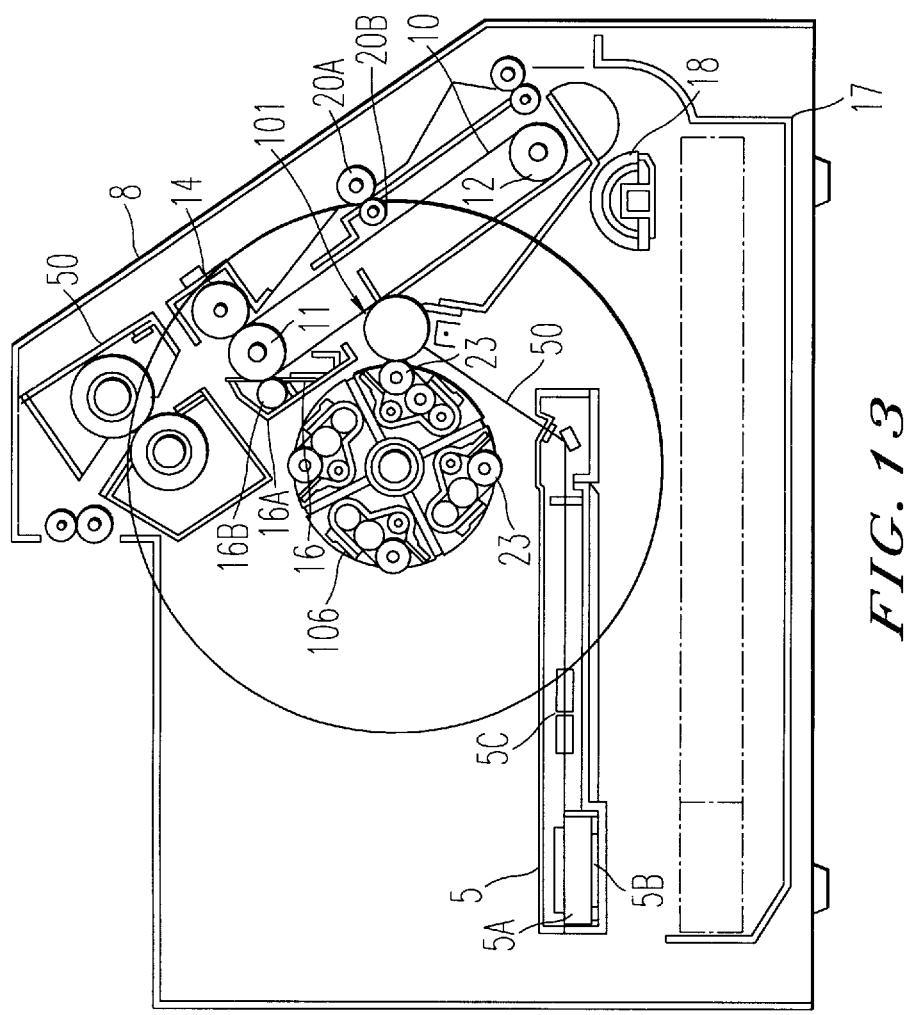
FIG. 13 is a front sectional view of a color image forming apparatus of a modified embodiment of the present invention.

FIG. 13 shows a modified embodiment of the present invention. In FIG. 13, the same structure as the first embodiment uses the same reference numbers as the first embodiment. In FIG. 13, a photoconductive drum 101 is used as a photoconductive device instead of the photoconductive belt 1 in the first embodiment. Further, the black developing device 7 of the first embodiment is provided in the revolving type developing device 106. Namely, a revolving type developing device 106 of this embodiment has four developing devices that are black, yellow, magenta and cyan developing devices.

In this embodiment, the photoconductive drum 101 and the revolving type developing device 106 are disposed horizontally to each other. Therefore, toner scattered from the developing roller 23 is not adhered to the photoconductive drum 101.

Toner cartridges of the revolving type developing device 106 are positioned outside of the projected plane of the process cartridge 31 as the first embodiment. Since the toner cartridges are exposed beyond the process cartridge when the front frame 8 is opened, the toner cartridges may be replaced without removing the process cartridge 31 from the color printer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A color image forming apparatus for forming color toner images on a sheet of paper, comprising:

an apparatus body;

a photoconductive medium in said body for bearing an electrostatic latent image thereon;

a plurality of developing devices in said body for developing the latent image on said photoconductive medium;

an intermediate transfer medium in said body for receiving developed latent images from said photoconductive medium and forming composite toner images thereon;

a front frame of said body positioned adjacent said intermediate transfer medium;

a paper feed device positioned in a lower portion of said body;

a paper output tray positioned in a upper portion of said body; and a paper transporting path between said paper feed device and said paper output tray, said paper transporting path passing between said intermediate transfer medium and said front frame, wherein said front frame is openable about a lower portion thereof to expose said paper transporting path.

2. An apparatus as claimed in claim 1, wherein said photoconductive medium, said developing devices and said intermediate transfer medium are positioned in said body so as to be inserted into and removed from said body when said front frame is opened.

3. An apparatus as in claim 1, wherein said photoconductive medium is integrated with said intermediate transfer medium as a process cartridge, and an outer surface of said process cartridge forms a portion of said paper transporting path.

4. An apparatus as claimed in claim 3, wherein said process cartridge further comprises a paper feed roller provided on said outer surface of said process cartridge.

5. A color image forming apparatus for forming color toner images on a sheet of paper, comprising:

an apparatus body;

a photoconductive medium in said body for bearing an electrostatic latent image thereon;

a plurality of developing devices in said body for developing the latent image on said photoconductive medium;

an intermediate transfer medium in said body for receiving developed latent images from said photoconductive medium and forming composite toner images thereon;

a front frame of said body positioned adjacent said intermediate transfer medium;

a paper feed device positioned in a lower portion of said body;

a paper output tray positioned in a upper portion of said body; and a paper transporting path between said paper feed device and said paper output tray, said paper transporting path passing between said intermediate transfer medium and said front frame, wherein said intermediate transfer medium comprises an intermediate transfer belt and two vertically spaced rollers which support said intermediate transfer belt.

6. An apparatus as claimed in claim 5, wherein an upper roller of said rollers is spaced from said front frame by a distance greater than a lower roller of said rollers so that said intermediate transfer belt is positioned aslant in said apparatus.

7. An apparatus as claimed in claim 5, wherein said paper transporting path is substantially straight.

8. An apparatus as claimed in claim 5, wherein said photoconductive medium and said developing devices are disposed horizontally to each other in said apparatus.

9. An apparatus as claimed in claim 5, wherein said photoconductive medium is positioned between said developing devices and said intermediate transfer medium, and wherein said photoconductive medium comprises:

a photoconductive belt; and two rollers which support said photoconductive belt so that a surface of said photoconductive belt which faces said intermediate transfer belt and a surface of said intermediate transfer belt which faces said photoconductive belt form an acute angle.

10. An apparatus as claimed in claim 5, wherein said developing devices comprise:

a black developing unit; and a revolving developing unit independent of said black developing unit and including a yellow developing device, a magenta developing device and a cyan developing device.

11. An apparatus as claimed in claim 10, wherein said black developing unit and said revolving developing unit are disposed adjacent said photoconductive medium so that said black developing unit is above said revolving developing unit.

12. A color image forming apparatus for forming color toner images on a sheet of paper, comprising:

an apparatus body;

a photoconductive medium in said body for bearing an electrostatic latent image thereon;

a plurality of developing devices in said body for developing the latent image on said photoconductive medium;

an intermediate transfer medium in said body for receiving developed latent images from said photoconductive medium and forming composite toner images thereon;

a front frame of said body positioned adjacent said intermediate transfer medium;

a paper feed device positioned in a lower portion of said body;

a paper output tray positioned in a upper portion of said body; and a paper transporting path between said paper feed device and said paper output tray, said paper transporting path passing between said intermediate transfer medium and said front frame, wherein a lower side of said front frame is pivotally supported on said body, and said photoconductive medium is integrated with said intermediate transfer medium as a process cartridge, said body further comprising a sub-frame which supports said process cartridge and is supported on said body for pivotal movement about an axis parallel to that of said front frame.

13. An apparatus as claimed in claim 12, wherein said sub-frame is movable to a first position in which said process cartridge may be replaced and a second position in which said developing devices may be replaced.

14. An apparatus as claimed in claim 13, wherein said process cartridge further comprises a charger which charges said photoconductive medium, wherein said charger is positioned so as to be cleanable when said front frame is in said second position without removing said process cartridge from said sub-frame.

15. An apparatus as claimed in claim 13, wherein said apparatus further comprises a cleaned toner container which contains the cleaned toner, wherein said cleaned toner container is positioned so as to be removable from said apparatus when said front frame is in said second position without removing said process cartridge from said sub-frame.

16. An apparatus as claimed in claim 12, including means for fixing said sub-frame in said first position.

17. An apparatus as claimed in claim 16, wherein said process cartridge comprises a handle which is provided on a vertical line passing through a center of gravity of said process cartridge when said process cartridge extends vertically.

18. A color image forming apparatus for forming color toner images on a sheet of paper, comprising:

an apparatus body;

a process cartridge in said apparatus body which includes at least a photoconductive medium for bearing an electrostatic latent image thereon;

a paper feed device in said body which is provided in a lower position of said body;

a paper output tray in said body which is provided in a upper position of said body;

a paper transporting path between said paper feed device and said paper output tray;

a front frame rotatably supported on said body, wherein said paper transporting path is exposed when said front frame is opened;

a sub-frame which supports said process cartridge and is supported on said body for pivotal movement; and a developing device in said body, said developing device being exposed when said sub-frame is opened.

19. An apparatus as claimed in claim 18, wherein said sub-frame may be moved to a position where said process cartridge is removed from said sub-frame.

20. An apparatus as claimed in claim 19, wherein said apparatus further comprises an intermediate transfer medium which is integrated with said photoconductive medium to form said process cartridge.

* * * * *